2,898,344
PRODUCTION OF α,α'-DICARBOXY-SUBSTITUTED PYRROLE DERIVATIVES

Hartwig Schütt, Hagen, Westphalia, Germany, assignor to Henkel & Cie, G.m.b.H., Dusseldorf-Holthausen, Germany, a corporation of Germany No Drawing. Application February 4, 1957
Serial No. 637,899

Claims priority, application Germany February 7, 1956

6 Claims. (Cl. 260—326.3)

This invention relates to a process for the production of pyrrole-carboxylic acid compounds, especially pyrrole-α,α'-dicarboxylic acid compounds, from pyrrole or substituted pyrroles.

Various methods for the production of pyrrole-carboxylic acid compounds have been described in the prior art and in the literature. For example, pyrrole-monocarboxylic acids have heretofore been produced by heating pyrrole with an aqueous solution of ammonium carbonate at elevated pressures. On the other hand, pyrrole-dicarboxylic acids and -tricarboxylic acids have previously been produced by oxidation of the corresponding alkyl-substituted pyrrole derivatives. This latter process, however, produces only mediocre yields and, moreover, can be applied to only a limited number of alkyl-substituted pyrroles.

It is an object of the present invention to provide a process for the production of pyrrole-carboxylic acid compounds, especially pyrrole-α,α'-dicarboxylic acid compounds, which produces economically attractive yields of the desired reaction product and which may be applied to a wide variety of pyrrole compounds, including unsubstituted pyrrole itself.

Other objects and advantages of the present invention will become apparent as the description proceeds.

I have found that α,α'-dicarboxy-substituted compounds of pyrrole and their salts can be produced in a very simple fashion and with very good yields by reacting pyrrole, β-substituted-pyrroles or β,β'-substituted-pyrroles with carbon dioxide at elevated temperatures and in the presence of alkaline-acting substances and, if desired, in the presence of solvents and catalysts, and transforming the pyrrole-carboxylic acid salt thus obtained into the free acid or its derivatives.

Using potassium carbonate as an example of an alkaline-acting substance, the reaction according to the present invention proceeds probably in accordance with the following general formula:

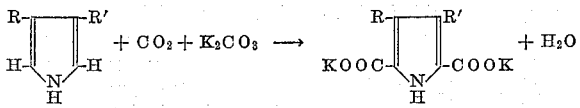

wherein R and R' are hydrogen or organic radicals.

While the precise mechanics of the reaction are not fully understood, it is believed that the carboxyl groups are first introduced into the α- and/or α'-positions and that thereafter the alkaline-acting substance neutralizes the carboxyl groups to form the corresponding carboxylic acid salt. The water formed by the neutralization reaction is absorbed and bound by the excess of alkaline-acting substance which is preferably provided.

The starting materials for the process in accordance with the invention may, in addition to pyrrole itself, be derivatives of pyrrole which are mono- or di-substituted in the β-position, such as β-methylpyrrole, β-ethylpyrrole, pyrrole-β-carboxylic acid, pyrrole-β-carboxylic acid-methyl ester, β,β'-dimethylpyrrole, β-methyl-β'-ethyl-pyrrole, β-methyl-β'-propylpyrrole, β-methylpyrrole-β'-carboxylic acid, pyrrole-β,β'-dicarboxylic acid-dimethyl ester, and the like.

The process may also be carried out with pyrrole-α-monocarboxylic acid compounds or their salts which are unsubstituted in the α'-position. Such compounds, which in accordance with the present invention may also be transformed into pyrrole-α,α'-dicarboxylic acid compounds and pyrrole-tricarboxylic acid compounds, are, for example, pyrrole-α-carboxylic acid, β-methyl-β'-ethyl-pyrrole-α-carboxylic acid, pyrrole-α,β'-dicarboxylic acid, and the like.

The alkaline-acting substance required for the reaction is preferably provided in the form of carbonates of the alkali metals or monovalent thallium. Especially good yields are obtained when potassium carbonate is used. The carbonates of lithium, sodium, rubidium and cesium produce less attractive yields from the point of view of profitable commercial operation, but they are equally operative on a laboratory scale. In place of the carbonates of the above-mentioned metals, their oxides, hydroxides, bicarbonates, formates or oxalates may also be used. For optimum results, the reaction conditions should be substantially anhydrous; consequently, the reactants, including the alkalies or alkali carbonates, should be as anhydrous as possible, although the presence of small amounts of moisture does not seriously interfere with the reaction. In order to utilize the often rather costly pyrroles to the fullest extent, at least that amount of alkaline-acting substance theoretically necessary for the neutralization of the carboxyl groups, but preferably an excess thereof, should be used.

The reaction in accordance with the present invention proceeds most advantageously at elevated temperatures, in general about 200° C.; the upper temperature limit is the temperature at which the starting material or the reaction product decomposes. The optimum reaction temperature is different for the individual starting materials, but in general it lies between 250 and 400° C.

The reaction is preferably carried out at elevated pressures by introducing into the reaction vessel at least the calculated amount of carbon dioxide, but preferably an excess thereof. The pressure during the reaction may vary within wide limits. The carbon dioxide may be diluted with inert gases, such as nitrogen. The reaction may, however, also be carried out at atmospheric pressure; for example, by passing a mixture of vaporized pyrrole compound and carbon dioxide over heated potassium carbonate.

I have further found that the reaction according to the present invention is favored by the presence of a number of catalysts. The metals zinc, cadmium, lead, mercury or iron, as well as their compounds, have especially advantageous effects. The above-mentioned metals may, for example, be used in the form of their oxides or their inorganic or organic acid salts. The amount of catalyst added may vary within wide limits; for example, from 0 to 15%, preferably from 0.5 to 5%, by weight based on the weight of the reaction mixture. In most cases the yields are satisfactory even without the addition of catalysts. The reaction product obtained in the presence of the above catalysts is, however, almost always more pure than the corresponding product produced without a catalyst, which is evidenced by the lighter color of the raw reaction product mixture.

In addition to the catalysts, inert fillers such as sand, finely divided carbon, kieselguhr, bentonite, powdered metal or metal shavings, inert salts such as sodium sulfate, potassium sulfate, calcium carbonate, and the like, may be added to the reaction mixture. The fillers are advantageously added if the reaction mixture tends to cake. Also, the addition of inert organic solvents or diluents, such as toluene, dioxan, tetrahydrofuran, pyridine, etc., may sometimes be advantageous. These solvents also have the effect of preventing the reaction mixture from caking, and they further facilitate the agitation of the reaction mixture.

For purification of the reaction mixture, it may be dissolved in water and may then be freed from discoloring matter and other undesirable components by treatment with activated charcoal. By acidification of the aqueous solution, the free pyrrole carboxylic acid compound is obtained in the form of a precipitate which is difficultly soluble in water. The relative insolubility of the dipotassium salts of pyrrole dicarboxylic acid compounds in a saturated potassium carbonate solution may also be made use of for recovery of the potassium salts. This method is often much more advantageous than the first-mentioned method because of the sensitivity of many pyrrole derivatives to acids. The raw reaction product may, however, also be transformed directly into derivatives of pyrrole dicarboxylic acids, such as their esters, in accordance with known methods.

Thus, the process in accordance with the present invention makes it possible to produce $\alpha,\alpha'$-dicarboxy-substituted compounds of pyrrole in a very simple fashion. The di- or poly-carboxylic acids of pyrrole produced in accordance with the present invention have utility as reactants in all those processes where di- or poly-functional compounds have heretofore been used; for example, in the production of poly-esters, synthetic resins and plasticizers.

The following examples will further illustrate the present invention and enable others skilled in the art to understand it more completely. It is, however, not intended to limit the invention to these particular illustrative examples.

*Example I*

A mixture of 50.0 gm. anhydrous potassium hydroxide, 5.0 gm. anhydrous cadmium chloride and 10.0 gm. freshly distilled pyrrole was placed into a 250 cc. rotary autoclave. Carbon dioxide was introduced into the autoclave until the internal pressure reached 50 atmospheres, and thereafter the autoclave was rotated and heated for 3 hours at 290° C. The internal pressure rose to a maximum of 90 atmospheres. After the reaction, the pressure in the autoclave was still 45 atmospheres. The almost white reaction product weighed 78.0 gm. and did not contain any more pyrrole. The reaction product was suspended in 50 cc. water, the cadmium chloride catalyst was filtered off, and the dicarboxylic acid was precipitated by acidifying the solution with hydrochloric acid. The pyrrole-$\alpha,\alpha'$-dicarboxylic acid was obtained with a yield of 19.3 gm., which corresponds to 84% of the theoretical yield.

*Example II*

A mixture of 50.0 gm. potassium hydroxide and 10.0 gm. pyrrole was placed into a 250 cc. rotary autoclave and then treated with carbon dioxide under the conditions described in Example I. The reaction product, which was darker than that obtained in Example I, was dissolved in water and the solution was treated with activated charcoal. After working up the aqueous solution as described in the previous example, 15.2 gm. of pyrrole-$\alpha,\alpha'$-dicarboxylic acid were obtained, which corresponds to 66% of the theoretical yield.

*Example III*

Working under the same reaction conditions as described in Examples I and II, 2.5 gm. pyrrole-$\alpha,\alpha'$-dicarboxylic acid were obtained from a mixture of 50.0 gm. anhydrous sodium carbonate and 10.0 gm. pyrrole.

*Example IV*

A mixture of 18.0 gm. anhydrous potassium carbonate and 2.0 gm. cadmium fluoride was placed into a rotary autoclave and 3.5 gm. $\beta$-methylpyrrole were added thereto. Carbon dioxide was introduced into the autoclave until the internal pressure reached 50 atmospheres, and thereafter the autoclave and its contents were heated for 3 hours at 280° C. The light reaction product was dissolved in 100 cc. water and, after filtration, the dipotassium salt of $\beta$-methylpyrrole-$\alpha,\alpha'$-dicarboxylic acid formed was precipitated as the corresponding free acid by acidification of the solution with hydrochloric acid. The yield of $\beta$-methylpyrrole-$\alpha,\alpha'$-dicarboxylic acid was 5.2 gm., which corresponds to 71% of the theoretical yield.

*Example V*

50.0 gm. anhydrous potassium carbonate were suspended in a mixture of 100 gm. pyridine and 10 gm. pyrrole and the suspension was placed into a rotary autoclave. Carbon dioxide was introduced into the autoclave until the internal pressure reached 50 atmospheres. The autoclave and its contents were then heated for 3 hours at 280° C. After cooling and releasing the internal pressure, the reaction products were filtered off and worked up as described in the preceding examples; that is, by dissolution in water and acidification of the solution with hydrochloric acid. 17.3 gm. of pyrrole-$\alpha,\alpha'$-dicarboxylic acid were obtained, which corresponds to 75% of the theoretical yield.

*Example VI*

A mixture of 50.0 gm. calcium carbonate, 50.0 gm. potassium carbonate, 5.0 gm. of a catalyst consisting of equal portions of cadmium fluoride and potassium fluoride, and 10.0 gm. pyrrole was heated in a rotary autoclave for 2 hours at 290° C. in an atmosphere of carbon dioxide at an initial pressure of 50 atmospheres. The reaction product weighed 119.7 gm. and was dissolved in 500 cc. of a hot 5% hydrochloric acid solution. After filtration, the solution was cooled in ice, whereupon 3.5 gm. pyrrole-$\alpha,\alpha'$-dicarboxylic acid precipitated out.

*Example VII*

A mixture of 2.7 gm. of the potassium salt of pyrrole-$\alpha$-carboxylic acid, 10.0 gm. potassium carbonate and 1.2 gm. anhydrous cadmium chloride was heated in a rotary autoclave for one hour at 280° C. in an atmosphere of carbon dioxide at an initial pressure of 50 atmospheres. The raw reaction product was worked up as described in Example I and yielded 2.1 gm. pyrrole-$\alpha,\alpha'$-dicarboxylic acid.

*Example VIII*

A mixture of 50.0 gm. potassium carbonate and 5.0 gm. anhydrous zinc chloride was placed into a 250 cc. stirring autoclave, together with a mixture of 10.0 gm. pyrrole and 100.0 gm. anhydrous dioxan.

At room temperature carbon dioxide was introduced into the autoclave four times until the internal pressure reached 50 atmospheres each time. Due to the solubility of carbon dioxide in dioxan, the pressure fell each time to 20 atmospheres. Thereafter, the autoclave and its contents were heated to 280° C. for 2 hours accompanied by stirring; the maximum pressure reached was 200 atmospheres. After cooling and releasing the internal pressure, the solid components of the reaction mixture were filtered off by vacuum filtration and dissolved in 200 cc. water. The solution was then filtered and the filtrate was acidified with hydrochloric acid. 11.3 gm. of pyrrole-$\alpha,\alpha'$-dicarboxylic acid were precipitated out, which corresponds to 49% of the theoretical yield. The product was purified by reprecipitation.

When equivalent amounts of metallic zinc, cadmium, lead, mercury or iron, or compounds of these metals, such as their oxides and inorganic or organic acid salts, were substituted for the cadmium and zinc compounds used as catalysts in the above examples, similarly good yields of the respective $\alpha,\alpha'$-dicarboxy-substituted pyrrole compounds were obtained.

Furthermore, when the oxides, hydroxides, bicarbonates, formates or oxalates of potassium, sodium, lithium, rubidium and cesium were substituted as alkaline-acting substances for the potassium carbonate or sodium carbonate in the above examples, the same results were obtained, except that the lithium and sodium salts produced substantially smaller yields of α,α'-dicarboxy-substituted pyrrole compounds than the corresponding potassium, rubidium and cesium salts.

While I have illustrated the present invention with the aid of certain specific embodiments thereof, it will be apparent to persons skilled in the art that my invention is not limited to these embodiments and that various changes and modifications may be made without departing from the spirit of the invention or the scope of the appended claims.

I claim:

1. The process of producing α,α'-dicarboxy-substituted pyrrole compounds having the structural formula

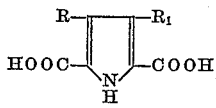

wherein R and R₁ are selected from the group consisting of hydrogen, lower alkyl, carboxy and —COO-lower alkyl, which comprises heating a compound having the structural formula

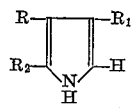

wherein R and R₁ have the meaning indicated above and R₂ is selected from the group consisting of hydrogen and carboxy, in an atmosphere of carbon dioxide under substantially anhydrous conditions to a temperature between about 200° C. and the decomposition temperature of said starting compound in the presence of an alkaline compound selected from the group consisting of the carbonates, bicarbonates, oxides, hydroxides, formates and oxalates of the alkali metals, dissolving the salt of the α,α'-dicarboxy-substituted pyrrole compound formed thereby in water, precipitating the corresponding α,α'-dicarboxy-substituted pyrrole compound by acidifying the aqueous solutions and separating the precipitate from the acidified solution.

2. The process of producing alkali metal salts of α,α'-dicarboxy-substituted pyrrole compounds having the structural formula

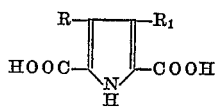

wherein R and R₁ are selected from the group consisting of hydrogen, carboxy, lower alkyl and —COO-lower alkyl, which comprises heating a compound having the structural formula

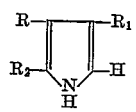

wherein R₂ is selected from the group consisting of hydrogen and carboxy, and R and R₁ have the meaning indicated above, in an atmosphere of carbon dioxide under substantially anhydrous conditions to a temperature between about 200° C. and the decomposition temperature of said starting compound in the presence of an alkaline compound selected from the group consisting of the carbonates, bicarbonates, oxides, hydroxides, formates and oxalates of the alkali metals.

3. The process according to claim 1, wherein the alkaline compound is potassium carbonate.

4. The process according to claim 2, wherein the alkaline compound is potassium carbonate.

5. The process of producing α,α'-dicarboxy-substituted pyrrole compounds having the structural formula

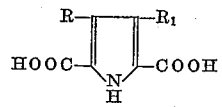

wherein R and R₁ are selected from the group consisting of hydrogen lower alkyl, carboxy and —COO-lower alkyl, which comprises heating a compound having the structural formula

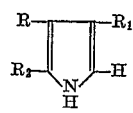

wherein R and R₁ have the meaning above indicated and R₂ is selected from the group consisting of hydrogen and carboxy, in an atmosphere of carbon dioxide under substantially anhydrous conditions to a temperature between about 200° C. and the decomposition temperature of said starting compound in the presence of an alkaline compound selected from the group consisting of the carbonates, bicarbonates, oxides, hydroxides, formates and oxalates of the alkali metals, and in the presence of a catalyst selected from the group consisting of zinc, cadmium, mercury, lead, iron and the halides of these metals, dissolving the salt of the α,α'-dicarboxy-substituted pyrrole compound formed thereby in water, precipitating the corresponding α,α'-dicarboxy-substituted pyrrole compound by acidifying the aqueous solution, and separating the precipitate from the acidified solution.

6. The process of producing alkali metal salts of α,α'-dicarboxy-substituted pyrrole compounds having the structural formula

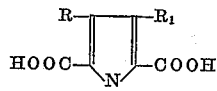

wherein R and R₁ are selected from the group consisting of hydrogen, carboxy, lower alkyl and —COO-lower alkyl, which comprises heating a compound having the structural formula

wherein R and R₁ have the meaning indicated above and R₂ is selected from the group consisting of hydrogen and carboxy, in an atmosphere of carbon dioxide under substantially anhydrous conditions to a temperature between about 200° C. and the decomposition temperature of said starting compound in the presence of an alkaline compound selected from the group consisting of the carbonates, bicarbonates, oxides, hydroxides, formates and oxalates of the alkali metals, and in the presence of a catalyst selected from the group consisting of zinc, cadmium, mercury, lead, iron and the halides of these metals.

References Cited in the file of this patent

Bell et al.: Berichte, vol. 10, page 1864.
Steinmann: Berichte, vol. 35, page 2533.